US012258125B2

(12) United States Patent
Barmichev et al.

(10) Patent No.: US 12,258,125 B2
(45) Date of Patent: Mar. 25, 2025

(54) LIFT SYSTEM FOR AIRCRAFT

(71) Applicant: The Boeing Company, Chicago, IL (US)

(72) Inventors: Sergey D. Barmichev, Chicago, IL (US); Aaron J. Kutzmann, Chicago, IL (US)

(73) Assignee: The Boeing Company, Chicago, IL (US)

( * ) Notice: Subject to any disclaimer, the term of this patent is extended or adjusted under 35 U.S.C. 154(b) by 165 days.

(21) Appl. No.: 17/584,583

(22) Filed: Jan. 26, 2022

(65) Prior Publication Data
US 2023/0234708 A1 Jul. 27, 2023

(51) Int. Cl.
B64D 11/00 (2006.01)
B64D 11/04 (2006.01)

(52) U.S. Cl.
CPC .......... B64D 11/0007 (2013.01); B64D 11/04 (2013.01)

(58) Field of Classification Search
CPC ....... B64D 11/0007; B64D 11/04; B66B 9/02; B66B 9/025; B66B 2201/307; B66F 2700/04
See application file for complete search history.

(56) References Cited

U.S. PATENT DOCUMENTS

| 4,660,787 | A | * | 4/1987 | Sprenger | ............ | B64D 11/0007 |
| | | | | | | 186/47 |
| 5,074,496 | A | * | 12/1991 | Rezag | .................... | B64D 11/04 |
| | | | | | | 244/118.1 |
| 6,305,643 | B1 | | 10/2001 | Sankrithi | | |
| 6,663,043 | B1 | * | 12/2003 | Luria | ....................... | B66C 1/663 |
| | | | | | | 244/118.1 |
| 8,387,916 | B2 | | 3/2013 | Baatz et al. | | |
| 2003/0057031 | A1 | * | 3/2003 | Gottlieb | ................... | B64D 9/00 |
| | | | | | | 187/394 |
| 2008/0136299 | A1 | * | 6/2008 | Peurifoy | ............ | B64D 11/0007 |
| | | | | | | 312/237 |

(Continued)

FOREIGN PATENT DOCUMENTS

| CN | 101595030 A | * 12/2009 | ......... B64D 11/0007 |
| DE | 40 29 628 C1 | 10/1991 | |

(Continued)

OTHER PUBLICATIONS

Extended European Search Report prepared by the European Patent Office in application No. EP 23 152 912.4 dated May 25, 2023.

(Continued)

Primary Examiner — Magdalena Topolski
Assistant Examiner — Anna L. Gordon
(74) Attorney, Agent, or Firm — Yee & Associates, P.C.

(57) ABSTRACT

A lift system for an aircraft includes a first galley cart, a second galley cart, a floor deck, and a frame. The frame defines a first storage zone, a second storage zone, and a third storage zone that are stacked. A bottom end of the first storage zone is aligned with the floor deck, a top end of the second storage zone is aligned with the floor deck, and a bottom end of the third storage zone is aligned with a top end of the first storage zone. The lift system also includes a first lift configured to move the first galley cart from the first storage zone to the second storage zone and a second lift configured to move the second galley cart from the first storage zone to the third storage zone.

20 Claims, 15 Drawing Sheets

(56) References Cited

U.S. PATENT DOCUMENTS

| | | | | |
|---|---|---|---|---|
| 2011/0084172 A1* | 4/2011 | Fairchild | ............... | B64D 9/00 |
| | | | | 187/254 |
| 2018/0016013 A1 | 1/2018 | Burd et al. | | |
| 2018/0201374 A1* | 7/2018 | Trümper | ............... | F25D 31/005 |
| 2019/0120662 A1* | 4/2019 | Wang | ............... | G01D 5/24409 |
| 2020/0339262 A1* | 10/2020 | Claflin | ............... | B64D 11/04 |
| 2021/0129992 A1 | 5/2021 | Sankrithi et al. | | |

FOREIGN PATENT DOCUMENTS

| | | | |
|---|---|---|---|
| DE | 199 55 801 | 5/2006 | |
| DE | 10200507326 A1 | 8/2007 | |
| DE | 102005057326 A1 * | 8/2007 | ......... B64D 11/0007 |
| EP | 1174340 A2 * | 1/2002 | ......... B64D 11/0007 |
| EP | 1279592 A2 | 1/2003 | |
| WO | WO-0001581 A1 * | 1/2000 | ............ B61B 13/00 |

OTHER PUBLICATIONS

European Patent Office Communication, dated Oct. 31, 2024, regarding Application No. EP23152912.4, 5 pages.

* cited by examiner

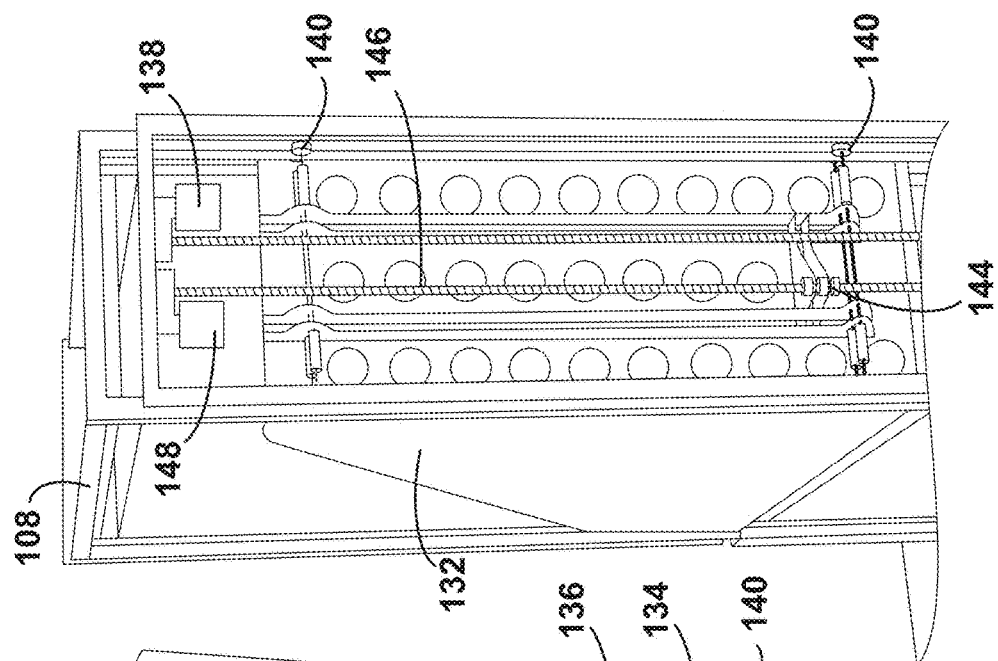
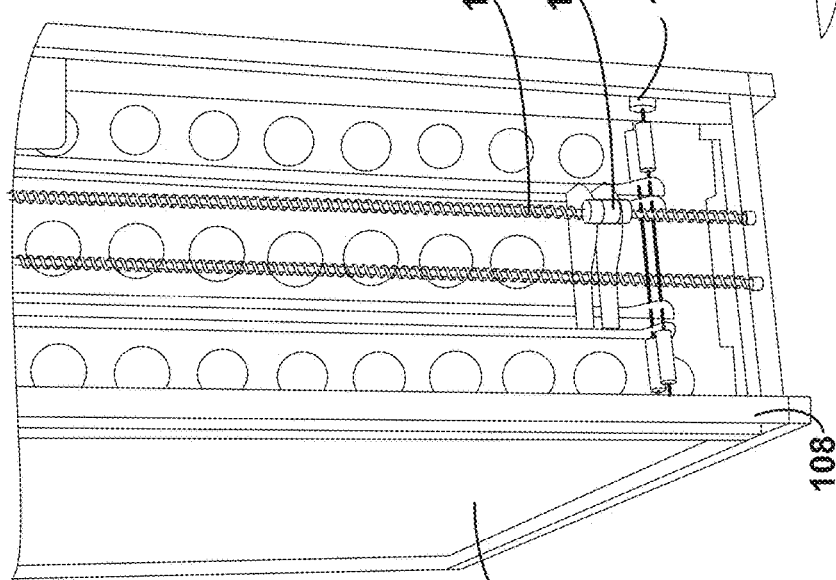
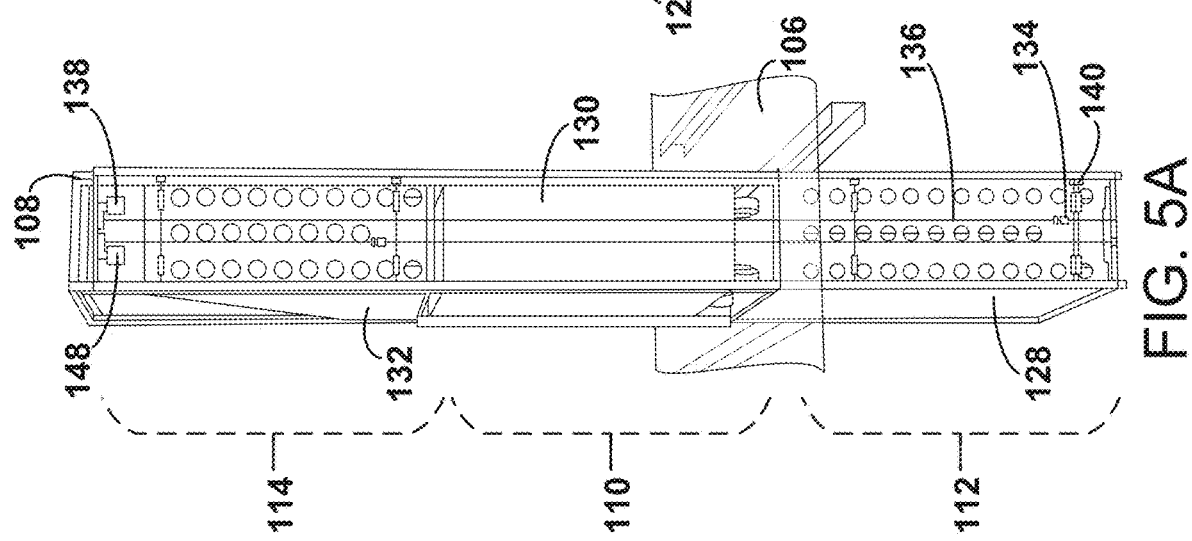

ATTACHING A FRAME TO A FLOOR DECK OF THE AIRCRAFT SUCH THAT THE FRAME DEFINES A FIRST STORAGE ZONE, A SECOND STORAGE ZONE, AND A THIRD STORAGE ZONE THAT ARE VERTICALLY STACKED, WHEREIN A BOTTOM END OF THE FIRST STORAGE ZONE IS VERTICALLY ALIGNED WITH THE FLOOR DECK, A TOP END OF THE SECOND STORAGE ZONE IS VERTICALLY ALIGNED WITH THE FLOOR DECK, AND A BOTTOM END OF THE THIRD STORAGE ZONE IS VERTICALLY ALIGNED WITH A TOP END OF THE FIRST STORAGE ZONE

302

INSTALLING, WITHIN THE FRAME, A FIRST LIFT CONFIGURED TO MOVE A FIRST GALLEY CART FROM THE FIRST STORAGE ZONE TO THE SECOND STORAGE ZONE

304

INSTALLING, WITHIN THE FRAME, A SECOND LIFT CONFIGURED TO MOVE A SECOND GALLEY CART FROM THE FIRST STORAGE ZONE TO THE THIRD STORAGE ZONE

```
┌─────────────────────────────────────────────────────┐
│ MOVING THE FIRST GALLEY CART INTO THE FRAME SUCH THAT│
│ THE FIRST GALLEY CART IS POSITIONED WITHIN THE FIRST │
│                   STORAGE ZONE                       │
└─────────────────────────────────────────────────────┘
                         308
                          ↓
┌─────────────────────────────────────────────────────┐
│ MOVING, VIA THE FIRST LIFT, THE FIRST GALLEY CART FROM THE │
│    FIRST STORAGE ZONE TO THE SECOND STORAGE ZONE     │
└─────────────────────────────────────────────────────┘
                         310
                          ↓
┌─────────────────────────────────────────────────────┐
│ MOVING THE SECOND GALLEY CART INTO THE FRAME SUCH THAT│
│ THE SECOND GALLEY CART IS POSITIONED WITHIN THE FIRST │
│                   STORAGE ZONE                       │
└─────────────────────────────────────────────────────┘
                         312
                          ↓
┌─────────────────────────────────────────────────────┐
│  MOVING, VIA THE SECOND LIFT, THE SECOND GALLEY CART │
│   FROM THE FIRST STORAGE ZONE TO THE THIRD STORAGE ZONE│
└─────────────────────────────────────────────────────┘
                         314
                          ↓
┌─────────────────────────────────────────────────────┐
│ MOVING A THIRD GALLEY CART INTO THE FIRST STORAGE ZONE│
│ BETWEEN THE FIRST GALLEY CART AND THE SECOND GALLEY   │
│                      CART                            │
└─────────────────────────────────────────────────────┘
                         316
```

FIG. 14
                                              350

LIFT SYSTEM FOR AIRCRAFT

FIELD

The present disclosure generally relates to a lift system, and more specifically to a lift system for aircraft galley carts.

BACKGROUND

Some commercial aircraft include galleys for storing and preparing food for passengers. Galleys generally include storage spaces for galley carts, which in turn contain food trays, beverages, and the like. For long flights during which two or three meals are served, large galleys are needed to accommodate the galley carts needed to store the large amount of food and waste. These large galleys occupy space that could otherwise be used for passenger seats. This reduces the amount of revenue for the airline. As such, a need exists for a commercial aircraft galley system in which galley carts may be efficiently stowed and accessed.

SUMMARY

One aspect of the disclosure is a lift system for an aircraft, the lift system comprising: a first galley cart; a second galley cart; a floor deck; a frame that defines a first storage zone, a second storage zone, and a third storage zone that are stacked, wherein a bottom end of the first storage zone is aligned with the floor deck, a top end of the second storage zone is aligned with the floor deck, and a bottom end of the third storage zone is aligned with a top end of the first storage zone; a first lift configured to move the first galley cart from the first storage zone to the second storage zone; and a second lift configured to move the second galley cart from the first storage zone to the third storage zone.

Another aspect of the disclosure is a lift system for an aircraft, the lift system comprising: a first galley cart; a second galley cart; a floor deck; a frame that defines a first storage zone, a second storage zone, and a third storage zone that are stacked, wherein a bottom end of the first storage zone is aligned with the floor deck, a top end of the second storage zone is aligned with the floor deck, and a bottom end of the third storage zone is aligned with a top end of the first storage zone; a first lift configured to move the first galley cart from the first storage zone to the second storage zone, the first lift comprising a first tray configured to support a third galley cart positioned in the first storage zone when the first tray is within the second storage zone; a second lift configured to move the second galley cart from the first storage zone to the third storage zone, the second lift comprising a second tray; and a control system configured to prevent collisions between the first tray and the second tray.

Another aspect of the disclosure is a method for installing a lift system in an aircraft, the method comprising: attaching a frame to a floor deck of the aircraft such that the frame defines a first storage zone, a second storage zone, and a third storage zone that are stacked, wherein a bottom end of the first storage zone is aligned with the floor deck, a top end of the second storage zone is aligned with the floor deck, and a bottom end of the third storage zone is aligned with a top end of the first storage zone; installing, within the frame, a first lift configured to move a first galley cart from the first storage zone to the second storage zone; and installing, within the frame, a second lift configured to move a second galley cart from the first storage zone to the third storage zone.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 5A is a rear view of a lift system, according to an example.

FIG. 5B is a close up rear view of a bottom end of a lift system, according to an example.

FIG. 5C is a close up rear view of a top end of a lift system, according to an example.

FIG. 13 is a block diagram of a method, according to an example.

FIG. 14 is a block diagram of a method, according to an example.

DETAILED DESCRIPTION

As noted above, a need exists for a commercial aircraft galley system in which galley carts are efficiently stowed and accessed. Examples herein include a lift system for an aircraft and methods for installing the lift system in the aircraft. The lift system includes a first galley cart (e.g., on wheels), a second galley cart, a floor deck, and a frame (e.g, a frame that defines a shaft). The frame defines a first storage zone (e.g., a middle zone), a second storage zone (e.g., a lower zone), and a third storage zone (e.g., an upper zone) that are (e.g., vertically) stacked. A bottom end of the first storage zone is (e.g., vertically) aligned with the floor deck, a top end of the second storage zone is (e.g., vertically) aligned with the floor deck, and a bottom end of the third storage zone is (e.g., vertically) aligned with a top end of the first storage zone. The lift system also includes a first lift (e.g., a first elevator) configured to move the first galley cart from the first storage zone to the second storage zone and a second lift (e.g., a second elevator) configured to move the second galley cart from the first storage zone to the third storage zone. Thus, two galley carts can be stored within the frame above the floor deck and another galley cart can be stored within the frame below the floor deck. Multiple lift systems can be arranged in a row as needed.

Fully loading the lift system can involve moving the first galley cart into the frame such that the first galley cart is positioned within the first storage zone, moving, via the first lift, the first galley cart from the first storage zone to the second storage zone, moving the second galley cart into the frame such that the second galley cart is positioned within the first storage zone, moving, via the second lift, the second galley cart from the first storage zone to the third storage zone, and moving a third galley cart into the first storage zone between the first galley cart and the second galley cart. When compared to previous systems, the lift system can generally store galley carts more efficiently, which frees up space for additional passenger seating and the resultant increase in revenue.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Figure 1:
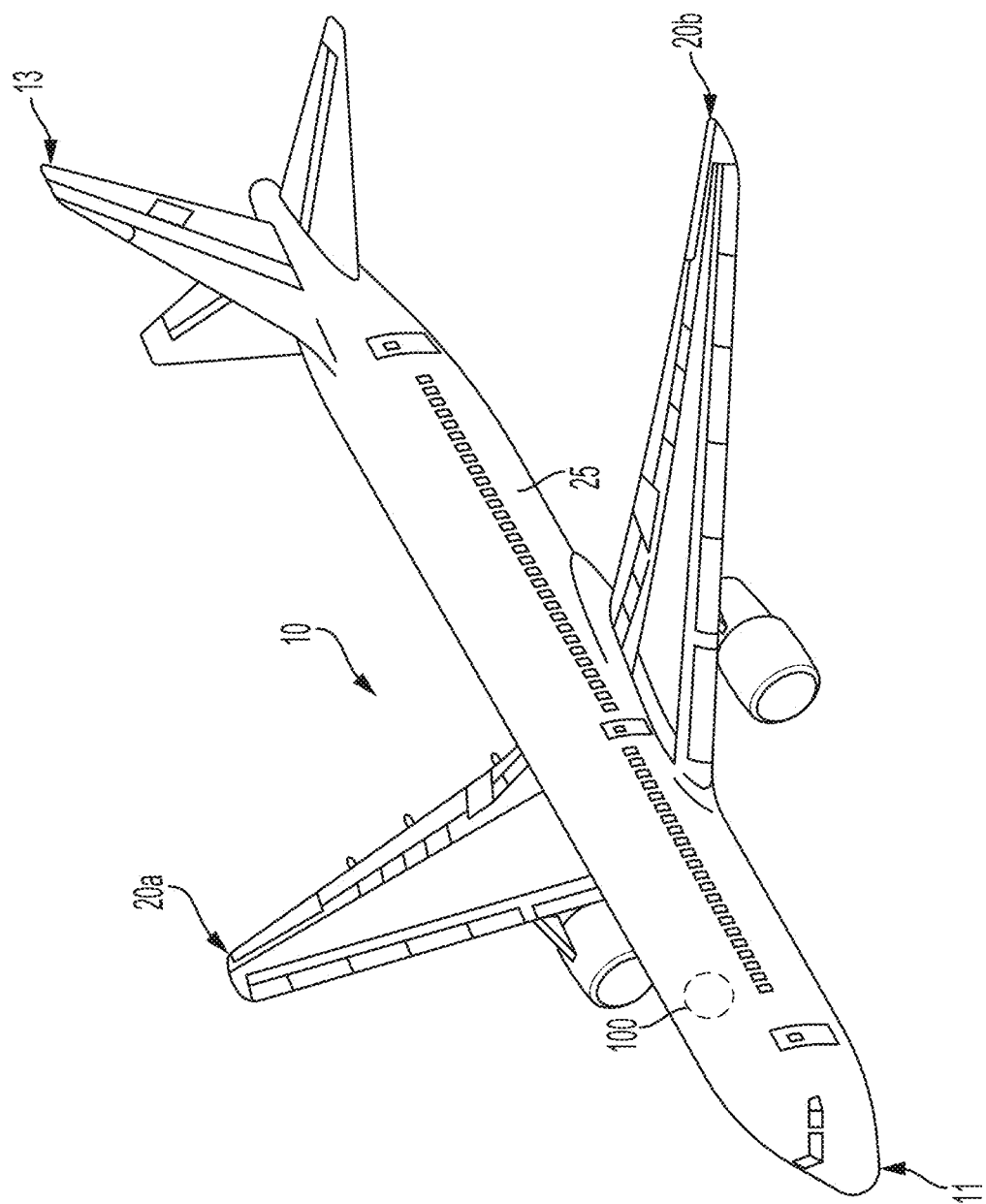
FIG. 1 is a perspective view of an aircraft, according to an example.

FIG. 1 is a perspective view of an aircraft 10 that includes a nose 11, a wing 20a, a wing 20b, a fuselage 25, a tail 13, and a lift system 100. The aircraft 10 includes many areas arranged for storage of items during flight. In one example, the fuselage 25 includes storage underneath a passenger compartment for storing luggage and other items or supplies. In another example, the passenger compartment in the fuselage 25 includes overhead bins and under seat areas for storing further items.

The aircraft 10 is shown as a commercial airliner, but other examples are possible. In FIG. 1, the lift system 100 is located near a forward end of the aircraft 10 (e.g., within a galley area), however this is not required.

Figure 2:
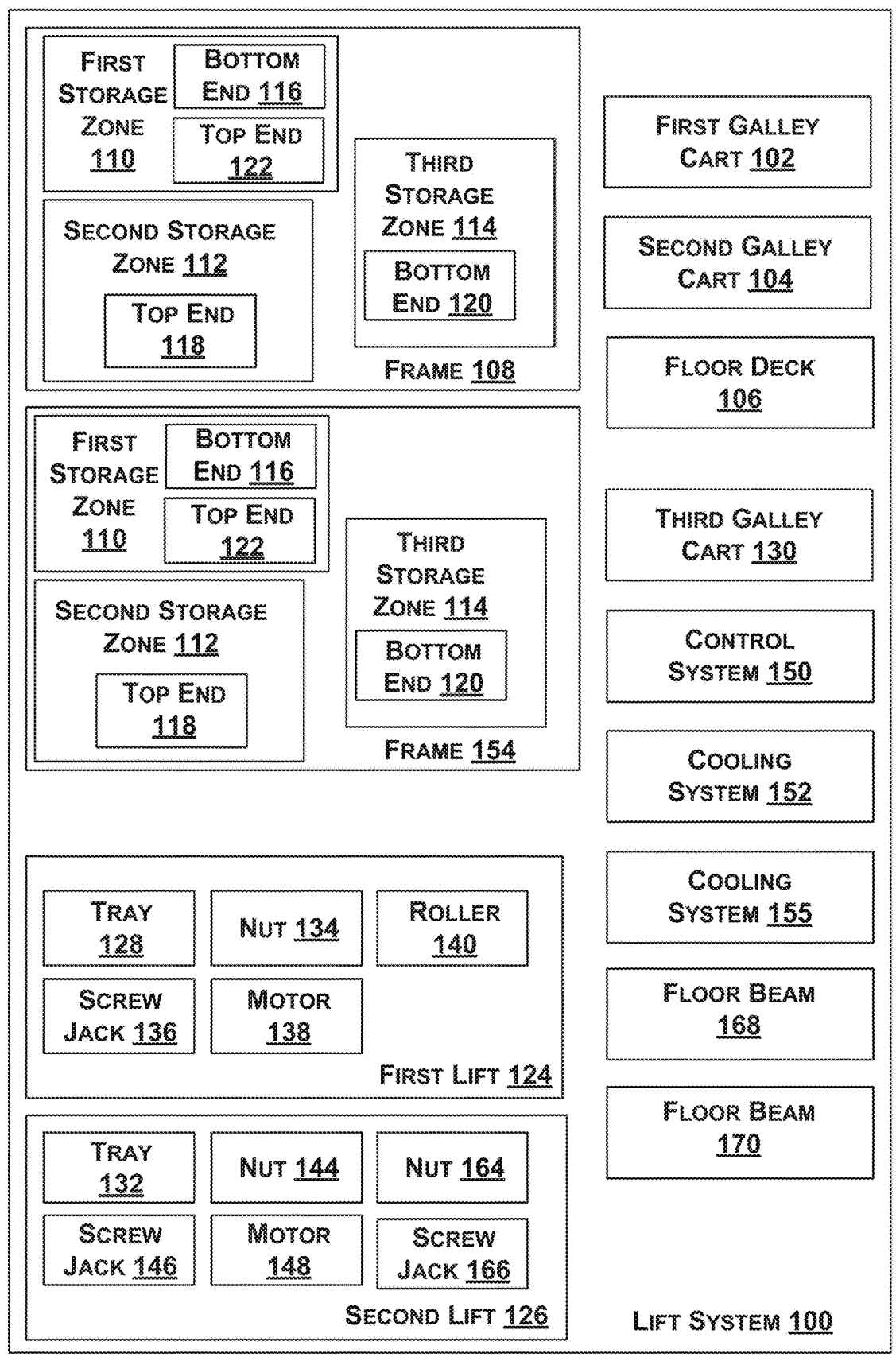
FIG. 2 is a block diagram of a lift system, according to an example.

FIG. 2 is a block diagram of the lift system 100. The lift system 100 includes a first galley cart 102, a second galley cart 104, a third galley cart 130, a floor deck 106, and a frame 108 that defines a first storage zone 110, a second storage zone 112, and a third storage zone 114 that are (e.g., vertically) stacked. A bottom end 116 of the first storage zone 110 is (e.g., vertically) aligned with the floor deck 106, a top end 118 of the second storage zone 112 is (e.g., vertically) aligned with the floor deck 106, and a bottom end 120 of the third storage zone 114 is (e.g., vertically) aligned with a top end 122 of the first storage zone 110. The lift system 100 also includes a first lift 124 configured to move the first galley cart 102 from the first storage zone 110 to the second storage zone 112 and a second lift 126 configured to move the second galley cart 104 from the first storage zone 110 to the third storage zone 114.

In some examples, the first galley cart 102, the second galley cart 104, and the third galley cart 130 are all substantially the same size or exactly the same size. In other examples, the first galley cart 102, the second galley cart 104, and the third galley cart 130 have different sizes. The first galley cart 102, the second galley cart 104, and the third galley cart 130 are each storage units (e.g., on wheels) that are configured to store food, beverages, and/or waste on the aircraft 10.

The floor deck 106 is generally a floor surface that is configured to support passengers and seats during flight. The floor deck 106 is supported by a floor beam 168 and a floor beam 170. The floor beam 168 and the floor beam 170 can be formed of metal, for example.

The frame 108 can be constructed of angle iron (e.g., metal) and fasteners as shown below, but other examples are possible. The lift system 100 also includes a frame 154 that includes one or more (e.g., all) of the features of the frame 108. That is, the lift system 100 can include many frames that each define three storage zones, like the frame 108 and the frame 154.

The first lift 124 includes a tray 128, a nut 134, a screw jack 136, a motor 138, and a roller 140.

The second lift 126 includes a tray 132, a nut 144, a screw jack 146, a motor 148, a nut 164, and a screw jack 166.

The lift system 100 also includes a control system 150, a cooling system 152, and a cooling system 155. The control system 150 generally includes a computing device, Boolean logic, hardware, software and/or sensors (e.g., proximity sensors) that are configured to prevent collisions between the tray 128 and the tray 132. The cooling system 152 is a refrigeration system that is configured to cool contents of the first galley cart 102 and the second galley cart 104 while the first galley cart 102 and the second galley cart 104 are within the frame 108. The cooling system 155 is a refrigeration system that is configured to cool contents of one or more galley carts that are within the frame 154.

Figure 3:
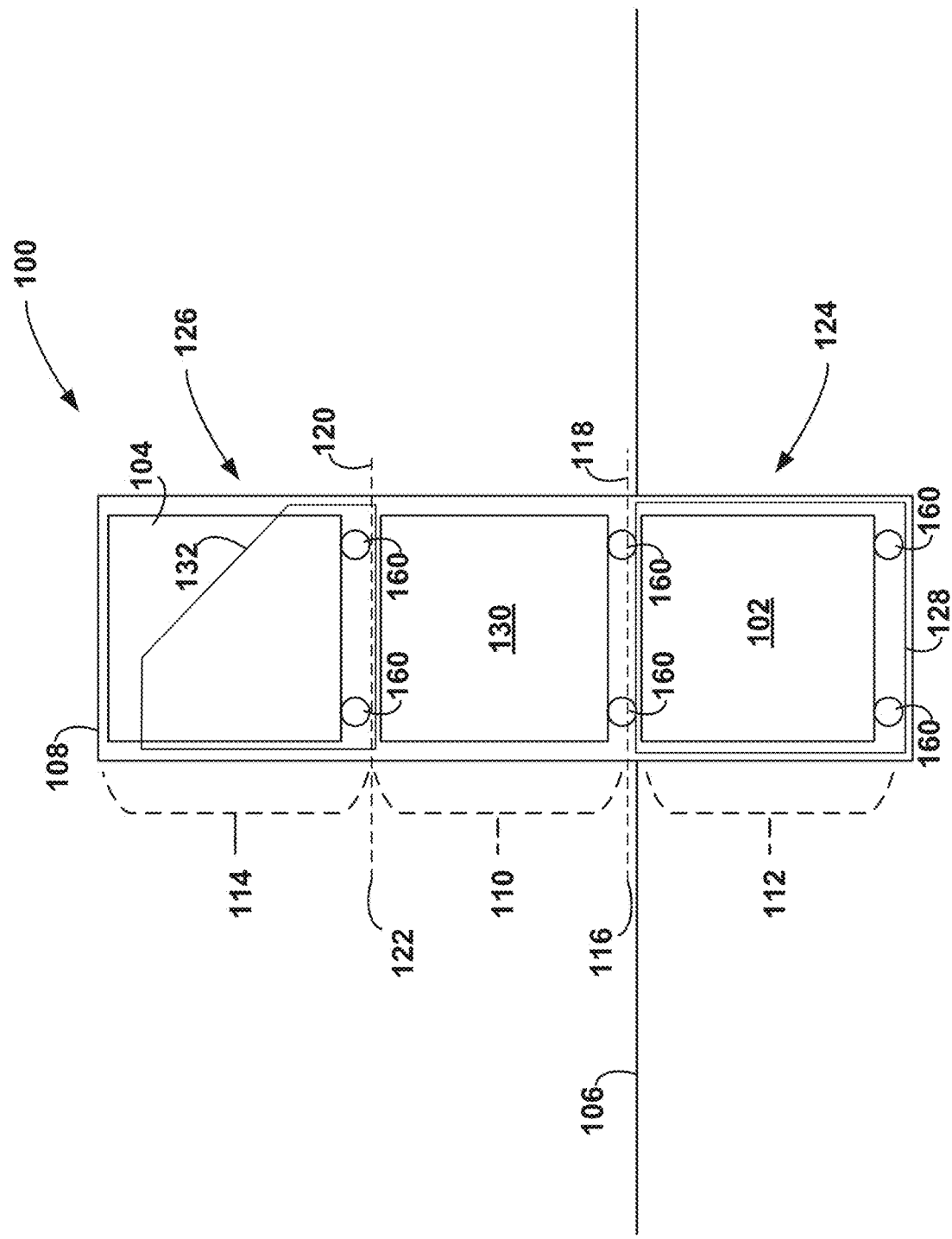
FIG. 3 is a schematic diagram of a lift system, according to an example.

FIG. 3 is a schematic diagram of the lift system 100. The lift system 100 includes the first galley cart 102, the second galley cart 104, the third galley cart 130, the floor deck 106, and the frame 108 that defines the first storage zone 110, the second storage zone 112, and the third storage zone 114 that are (e.g., vertically) stacked. The bottom end 116 of the first storage zone 110 is (e.g., vertically) aligned with the floor deck 106, the top end 118 of the second storage zone 112 is (e.g., vertically) aligned with the floor deck 106, and the bottom end 120 of the third storage zone 114 is (e.g., vertically) aligned with the top end 122 of the first storage zone 110. The first lift 124 is configured to move the first galley cart 102 from the first storage zone 110 (e.g., on the floor deck 106) to the second storage zone 112 (e.g., below the floor deck 106). The second lift 126 is configured to move the second galley cart 104 from the first storage zone 110 to the third storage zone 114 (e.g., above the floor deck 106).

In this example, the first galley cart 102, the second galley cart 104, and the third galley cart 130 are substantially equal in size, however this is not the case in other examples described below. The first galley cart 102, the second galley cart 104, and the third galley cart 130 each include one or more wheels 160.

As shown, the third galley cart 130 can be positioned in the first storage zone 110 while the first galley cart 102 is in the second storage zone 112 and the second galley cart 104 is in the third storage zone 114. For example, the tray 128 of the first lift 124 supports the third galley cart 130 while the third galley cart 130 is in the first storage zone 110 and the tray 128 is in the second storage zone 112.

The second lift 126 includes the tray 132 that is configured to house the second galley cart 104 in the third storage zone 114 while the third galley cart 130 is positioned in the first storage zone 110 and the first galley cart 102 is positioned in the second storage zone 112.

Within examples, an installer can attach (e.g., fasten using fasteners) the frame 108 to the floor deck 106 (e.g., to the floor beam 168, the floor beam 170, and the floor deck 106) of the aircraft 10 such that the frame 108 defines the first storage zone 110, the second storage zone 112, and the third storage zone 114 that are (e.g., vertically) stacked and such that the bottom end 116 of the first storage zone 110 is (e.g., vertically) aligned with the floor deck 106, the top end 118 of the second storage zone 112 is (e.g., vertically) aligned with the floor deck 106, and the bottom end 120 of the third storage zone 114 is (e.g., vertically) aligned with the top end 122 of the first storage zone 110. The installer can also install, within the frame 108, the first lift 124 that is configured to move the first galley cart 102 from the first storage zone 110 to the second storage zone 112 and install, within the frame 108, the second lift 126 that is configured to move the second galley cart 104 from the first storage zone 110 to the third storage zone 114.

Figure 4A:
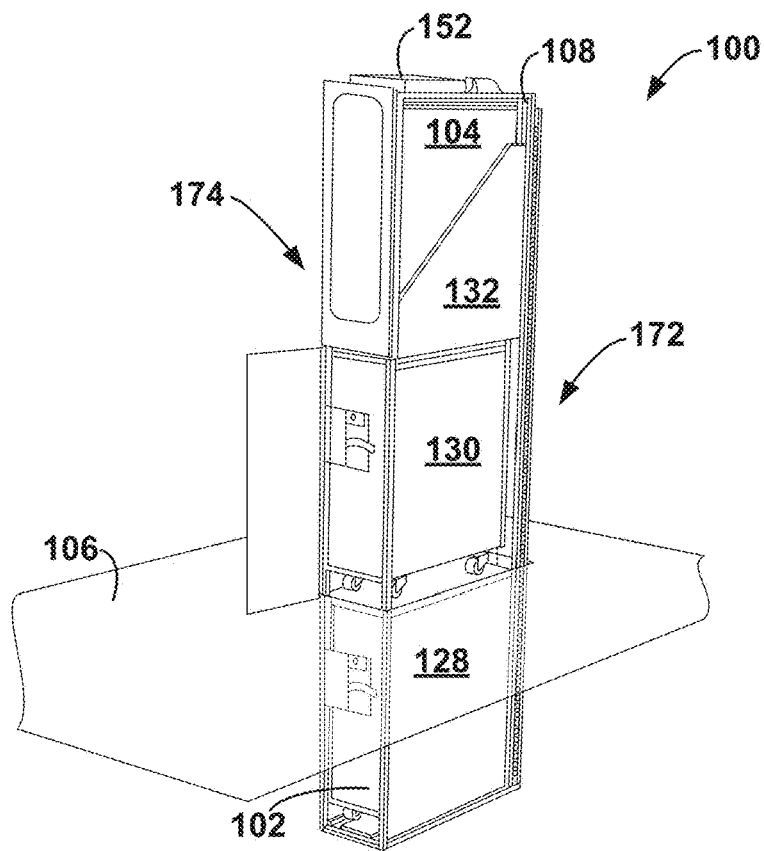
FIG. 4A is a front perspective view of a lift system, according to an example.

FIG. 4A is a front perspective view of the lift system 100, showing a first side 172 of the frame 108 and a second side 174 of the frame 108. As shown, the first galley cart 102 is configured to fit snugly within the tray 128 and the second galley cart 104 is configured to fit snugly within the tray 132. The tray 128 and the tray 132 are each generally formed of metal or plastic and are slightly narrower than the frame 108 in the horizontal dimensions to allow for movement within the frame 108.

Also shown is a chiller portion of the cooling system 152 atop the frame 108. The chiller may include a compressor and a condenser, for example.

Figure 4B:
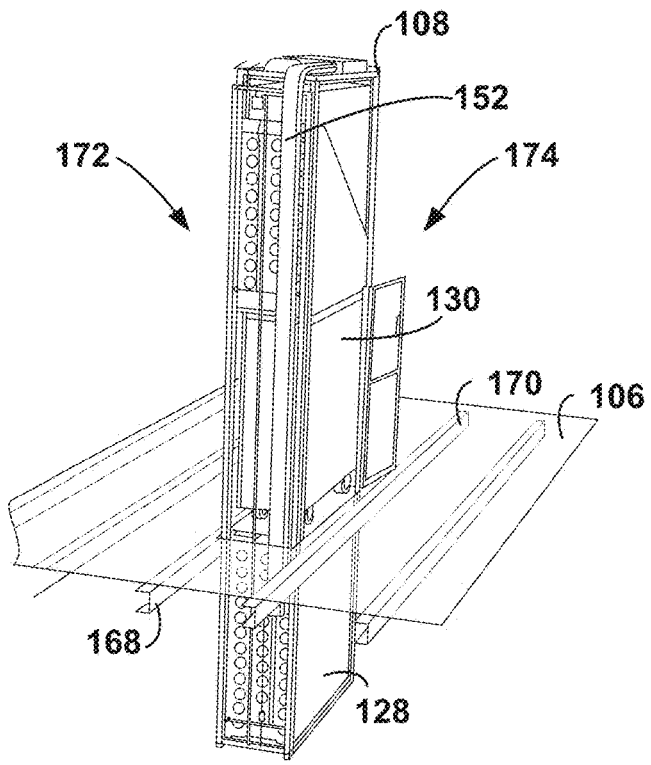
FIG. 4B is a rear perspective view of a lift system, according to an example.

FIG. 4B is a rear perspective view of the lift system 100. The lift system 100 includes the floor beam 168 and the floor beam 170. The first side 172 of the frame 108 abuts the floor beam 168 and the second side 174 of the frame 108 opposite the first side 172 abuts the floor beam 170. As shown, the floor deck 106 is supported by (e.g., is fastened to) the floor beam 168 and the floor beam 170.

Also shown is a duct portion of the cooling system 152 behind the frame 108. The duct portion may be configured to carry chilled air from the chiller and be configured to be coupled to one or more of the first galley cart 102, the second galley cart 104, and the third galley cart 130 simultaneously.

FIG. 5A is a rear view of the lift system 100, showing the floor deck 106, the first storage zone 110, the second storage zone 112, and the third storage zone 114. As shown, the motor 138 and the motor 148 are both located near a top end of the frame 108. The screw jack 136 and the screw jack 146 both span nearly the entire height of the frame 108, from the third storage zone 114 to the second storage zone 112.

FIG. 5B is a close up rear view of a bottom end of the lift system 100, showing the frame 108, the tray 128, the screw jack 136, the nut 134, and the roller 140. The nut 134 is attached to the tray 128 (e.g., via a bracket), the screw jack 136 (e.g., a threaded rod) is threadedly engaged with the nut 134, and the motor 138 (shown in FIG. 5A and FIG. 5C) is configured to rotate the screw jack 136 to move the tray 128 within the frame 108 between the first storage zone 110 and the second storage zone 112.

The roller 140 is configured to guide the tray 128 within the frame 108 via engagement of the roller 140 with the frame 108. Several rollers 140 can engage surfaces of the frame 108 in this way to guide movement of the tray 128 within the frame 108. The roller 140 includes one or more wheels rotatably attached to one or more axels that are coupled to the tray 128.

FIG. 5C is a close up rear view of a top end of the lift system 100. The second lift 126 includes the tray 132, the nut 144 attached to the tray 132, the screw jack 146 threadedly engaged with the nut 144, and the motor 148 configured to rotate the screw jack 146 to move the tray 132 within the frame 108 between the first storage zone 110 and the third storage zone 114. The second lift 126 also includes one or more rollers 140 that engage surfaces of the frame 108 to guide movement of the tray 132 within the frame 108. The roller 140 include one or more wheels rotatably attached to one or more axels that are coupled to the tray 132.

Figure 6C:
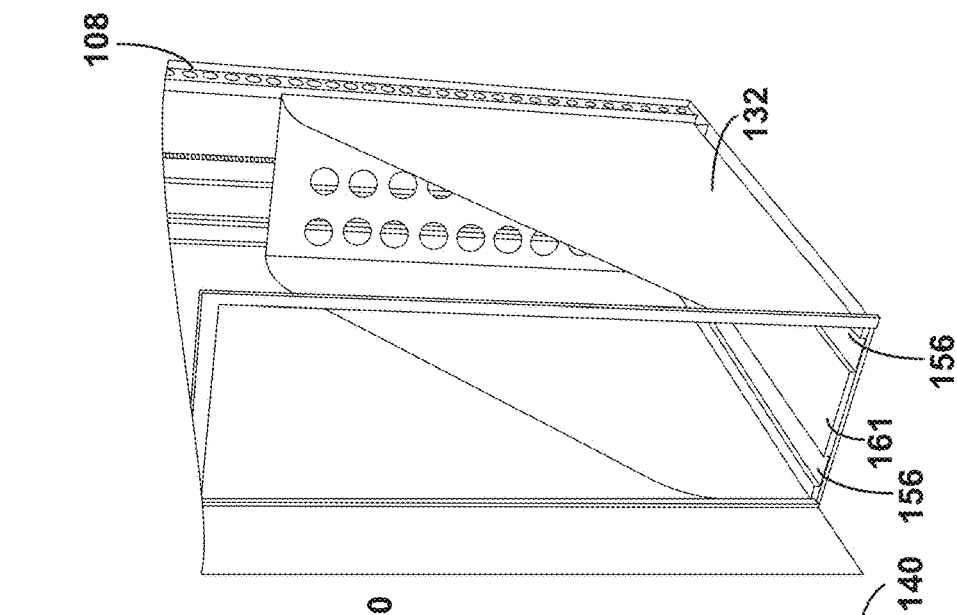
FIG. 6C is a front perspective view of a tray, according to an example.
Figure 6B:
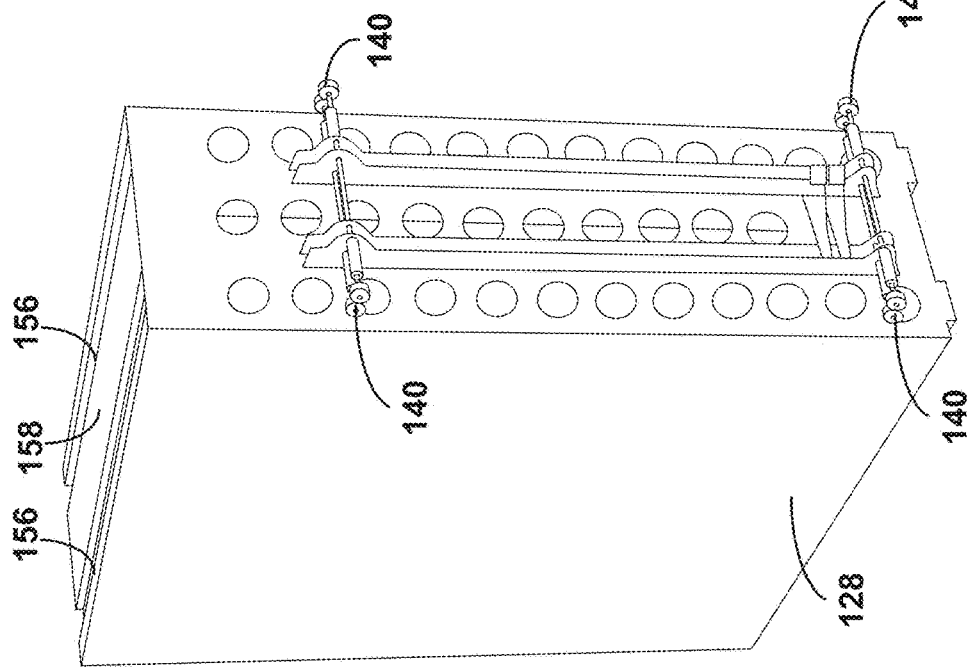
FIG. 6B is a rear perspective view of a tray, according to an example.
Figure 6A:
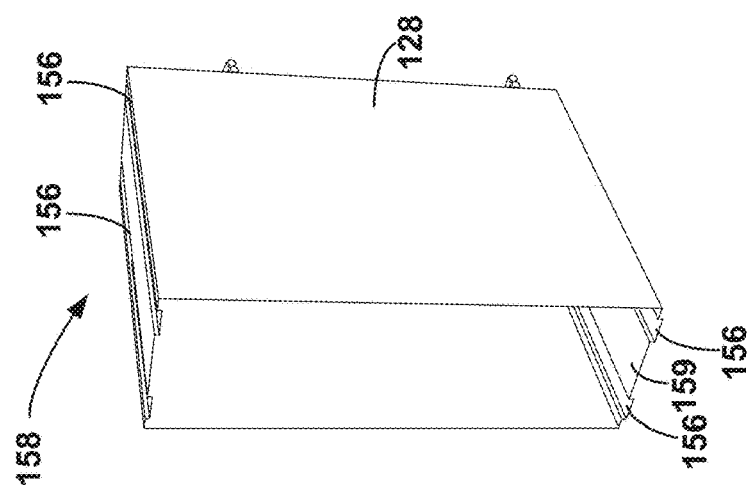
FIG. 6A is a front perspective view of a tray, according to an example.

FIG. 6A is a front perspective view of the tray 128. The tray 128 includes channels 156 on an upper surface 158 of the tray 128. The channels 156 are configured to receive wheels 160 of a third galley cart 130 (see FIG. 3). The tray 128 also includes channels 156 on an inner bottom surface 159 for receiving the wheels 160 of the first galley cart 102 (see FIG. 3).

FIG. 6B is a rear perspective view of the tray 128, showing the channels 156 on the upper surface 158 and the rollers 140.

FIG. 6C is a front perspective view of the tray 132. The tray 132 includes channels 156 on an inner bottom surface 161 for receiving the wheels 160 of the second galley cart 104 (see FIG. 3).

Figure 7:
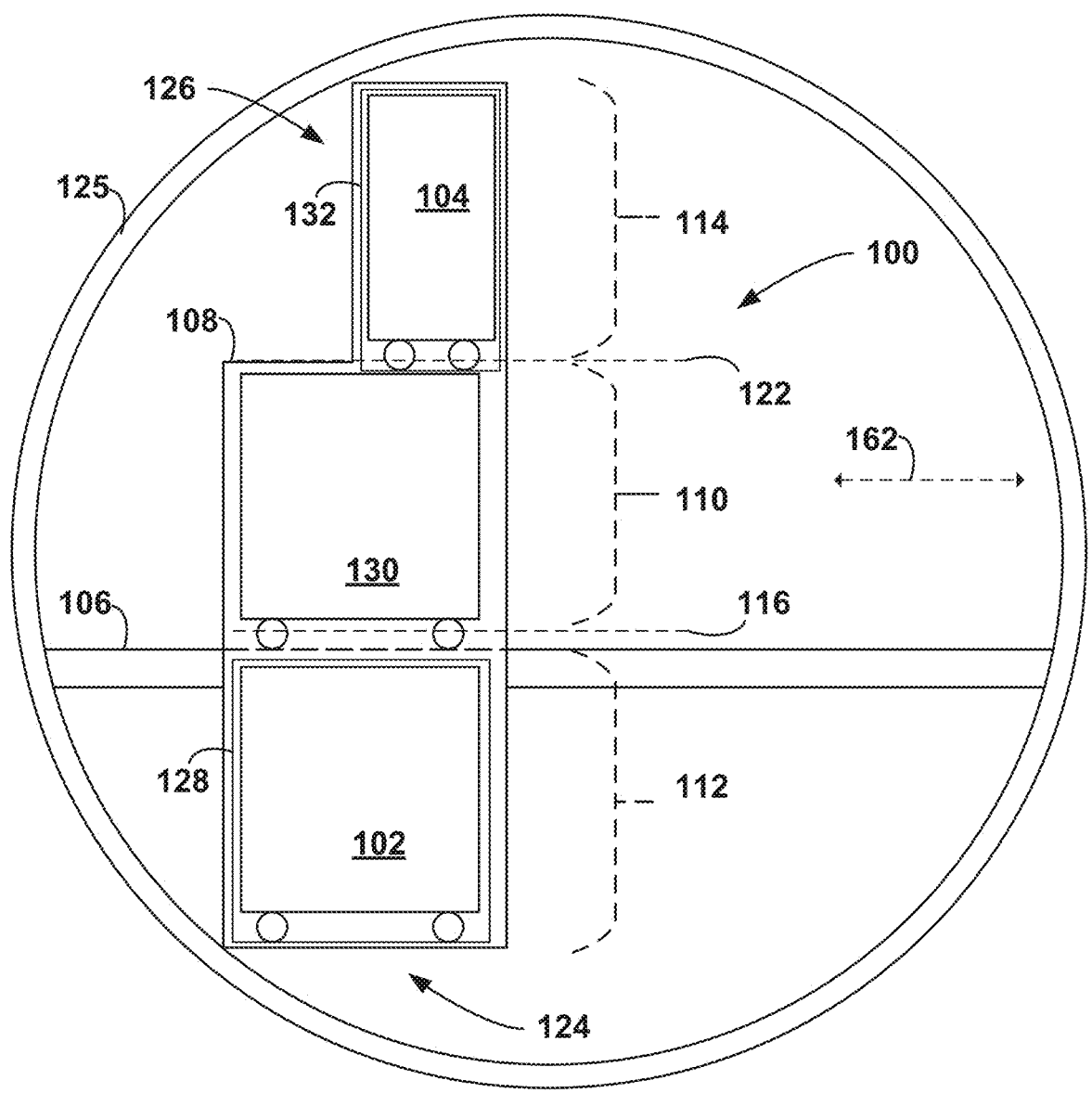
FIG. 7 is a cross sectional view of a lift system, according to an example.

FIG. 7 is a cross sectional view of the lift system 100 and the fuselage 125. In FIG. 7, the second galley cart 104 is smaller (e.g., narrower) than both the first galley cart 102 and the third galley cart 130 in a horizontal direction 162 (e.g., inboard/outboard). Accordingly, the third storage zone 114 is narrower than the first storage zone 110 and the second storage zone 112 in the horizontal direction 162 and the tray 132 is narrower than the tray 128 in the horizontal direction 162. In certain smaller aircraft, it can be useful to have the second galley cart 104 and the third storage zone 114 be smaller in the horizontal direction 162 than their counterparts.

Figure 8B:
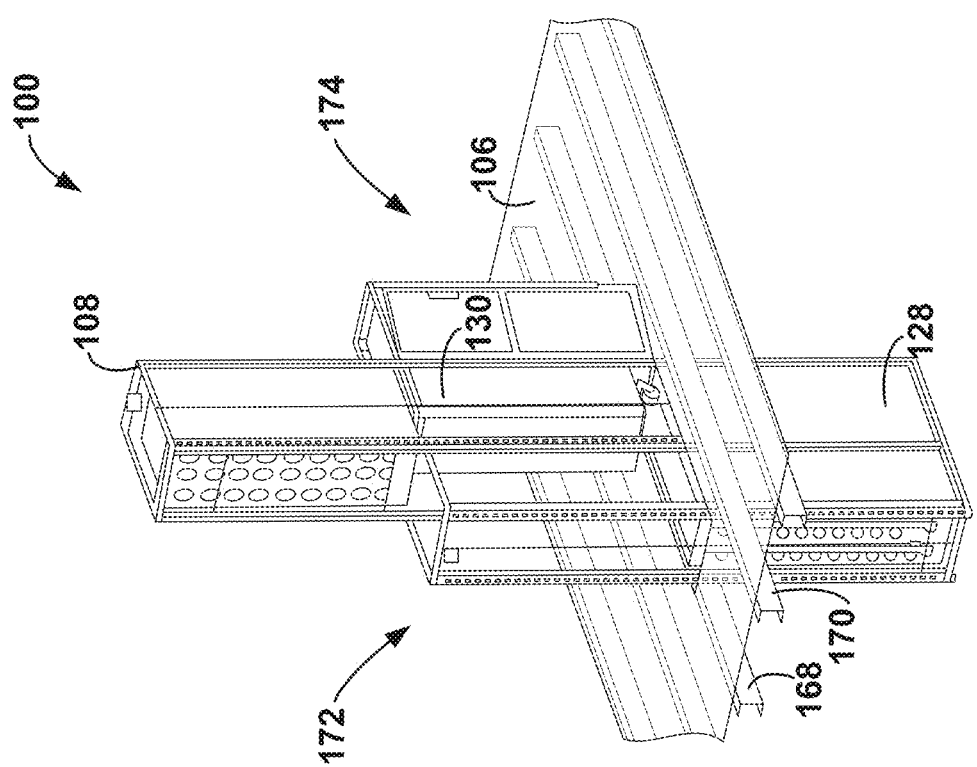
FIG. 8B is a rear perspective view of a lift system, according to an example.
Figure 8A:
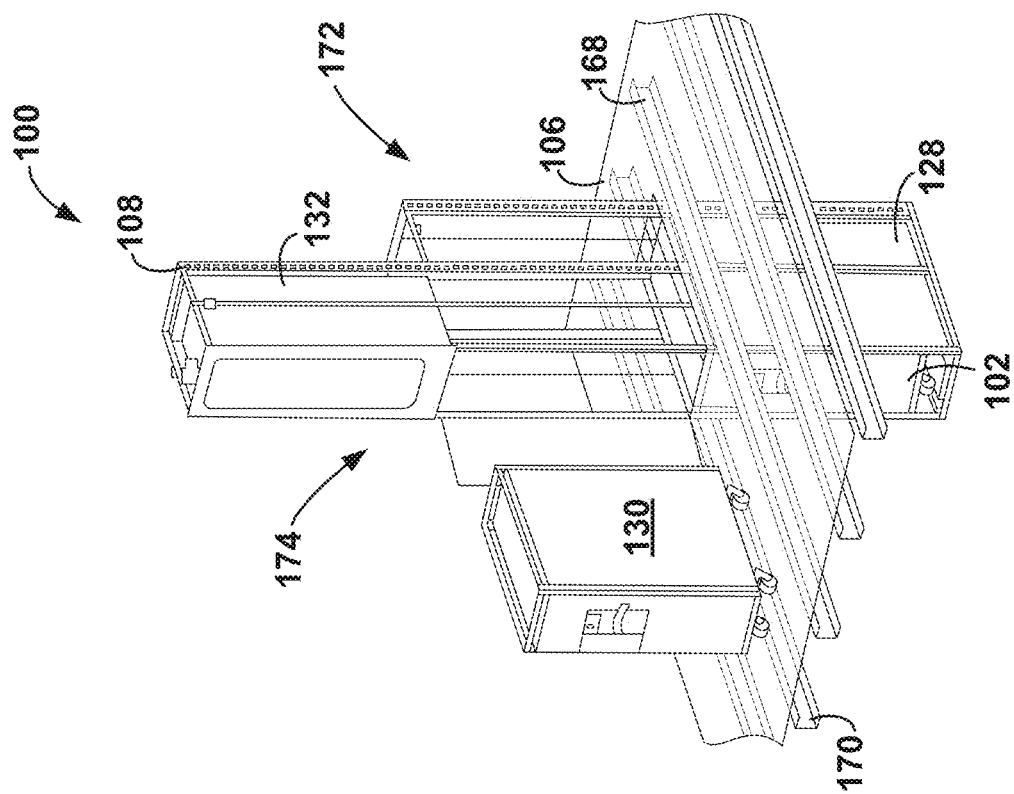
FIG. 8A is a front perspective view of a lift system, according to an example.

FIG. 8A is a front perspective view of the lift system 100 shown in FIG. 7, showing the first side 172 of the frame 108 and the second side 174 of the frame 108. As shown, the first galley cart 102 is configured to fit snugly within the tray 128 and the second galley cart 104 is configured to fit snugly within the tray 132. The tray 128 and the tray 132 are each generally formed of metal or plastic. The tray 128 is slightly narrower in the horizontal dimensions than the first storage zone 110 and the second storage zone 112 to allow for movement within the frame 108. The tray 132 is slightly narrower in the horizontal dimensions than the third storage zone 114 to allow for movement within the frame 108.

FIG. 8B is a rear perspective view of the lift system 100 shown in FIG. 7. The lift system 100 includes the floor beam 168 and the floor beam 170. The first side 172 of the frame 108 abuts the floor beam 168 and the second side 174 of the frame 108 opposite the first side 172 abuts the floor beam 170. As shown, the floor deck 106 is supported by (e.g., is fastened to) the floor beam 168 and the floor beam 170.

Figure 9:
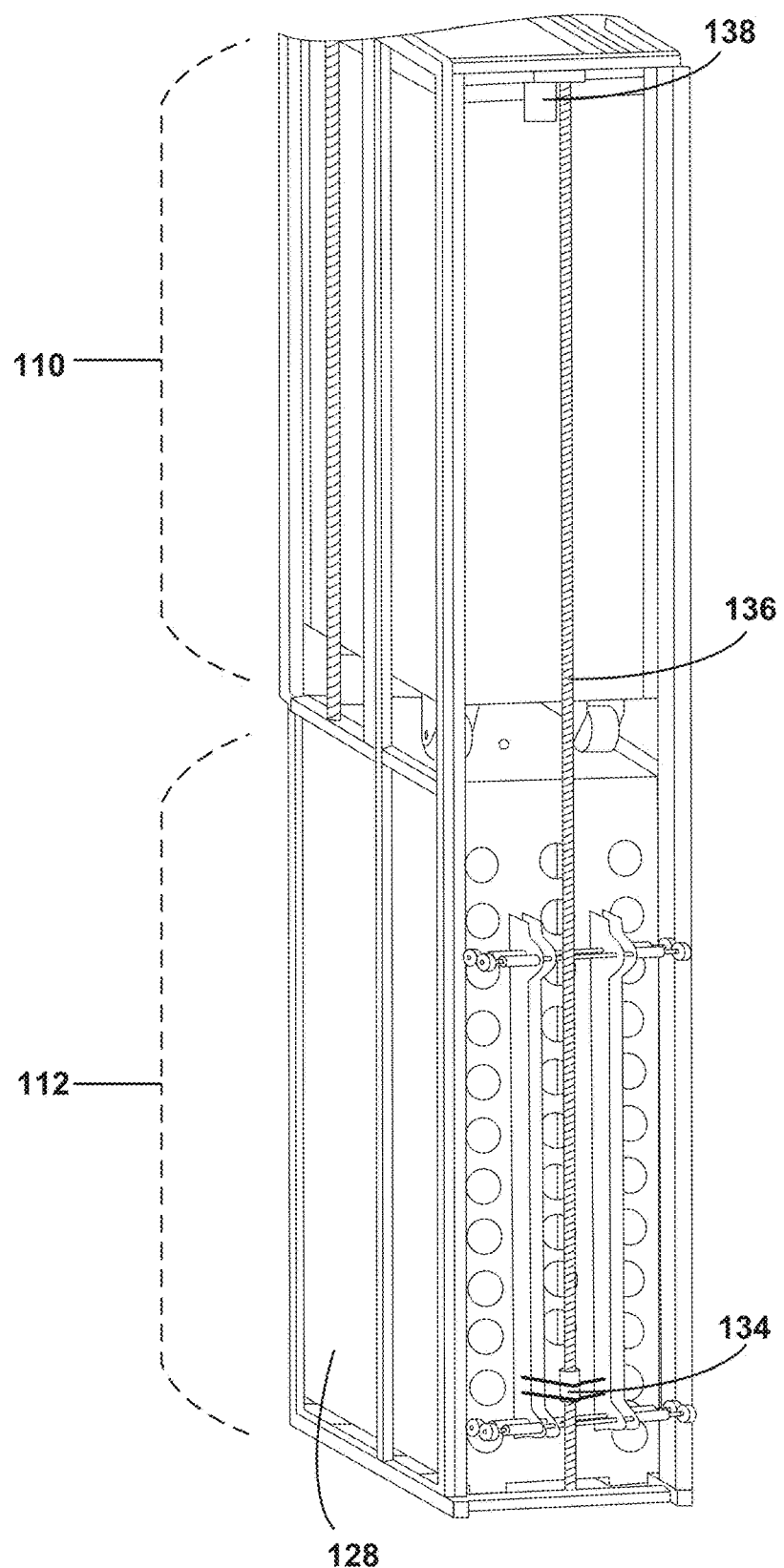
FIG. 9 is a rear close up view of a lift system, according to an example.

FIG. 9 is a rear close up view of the first storage zone 110 and the second storage zone 112 of the lift system 100 shown in FIG. 7. The first lift 124 includes the nut 134 attached to the tray 128 (e.g., via a bracket), the screw jack 136 threadedly engaged with the nut 134, and the motor 138 configured to rotate the screw jack 136 to move the tray 128 within the frame 108 between the first storage zone 110 and the second storage zone 112.

The motor 138 is located at a top end of the first storage zone 110. The screw jack 136 extends from the top end of the first storage zone 110 to a bottom end of the second storage zone 112.

Figure 10A:
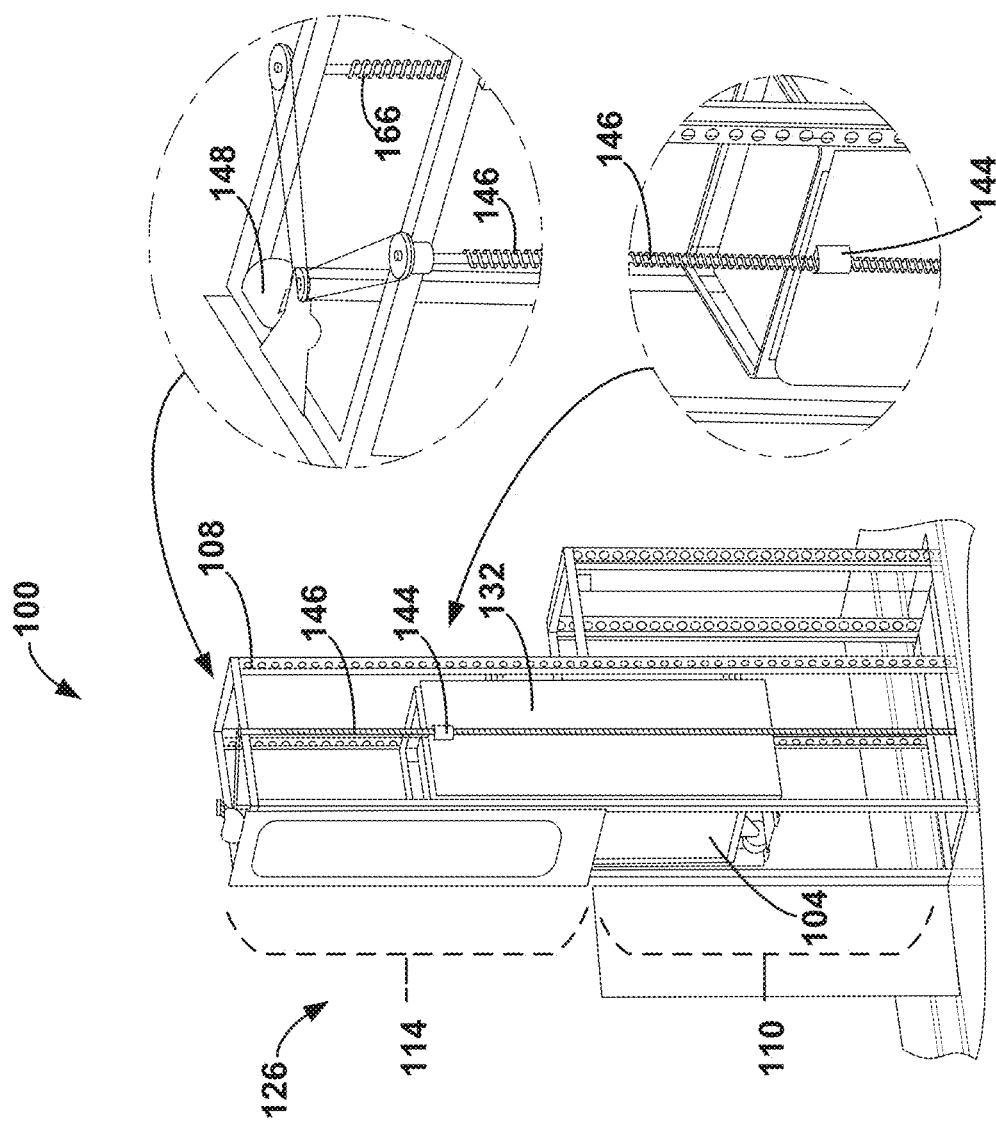
FIG. 10A is a front perspective view of a lift system, according to an example.

FIG. 10A is a front perspective view of the lift system 100 shown in FIG. 7. More specifically, FIG. 10A shows the first storage zone 110 and the third storage zone 114. The second lift 126 includes the nut 144 attached to the tray 132, the nut 164 (shown in FIG. 11) attached to the tray 132 opposite the nut 144, the screw jack 146 threadedly engaged with the nut 144, the screw jack 166 threadedly engaged with the nut 164 opposite the screw jack 146, and the motor 148 configured to rotate the screw jack 146 (e.g., via a belt) and the screw jack 166 (e.g., via a belt) to move the tray 132 within the frame 108 between the first storage zone 110 and the third storage zone 114.

Figure 10B:
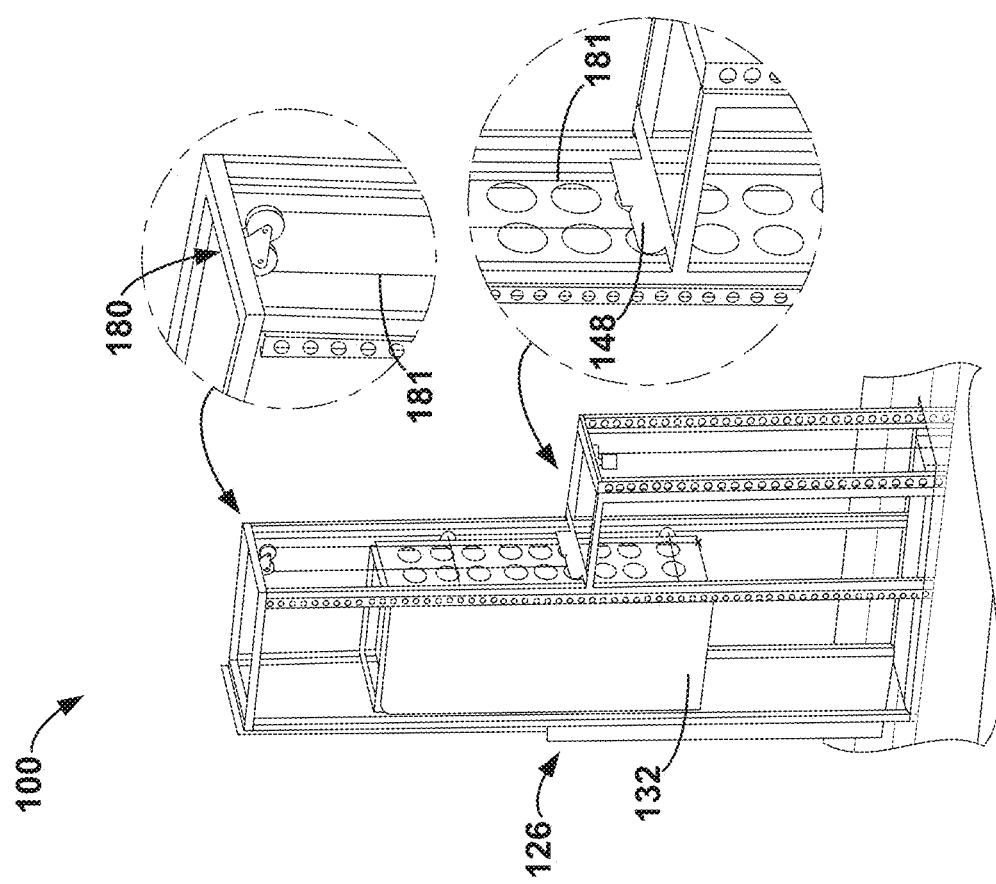
FIG. 10B is a rear perspective view of a lift system, according to an example.

FIG. 10B is a rear perspective view of an additional example of the lift system 100. In FIG. 10B, the second lift 126 is configured to move the tray 132 via one or more pulleys 180 instead of via screw jacks and nuts as described above. In this example, the motor 148 takes the form of a winch that winds or unwinds a cable 181 that runs through the one or more pulleys 180 and is anchored to the tray 132 at an opposite end of the cable 181.

Figure 11C:
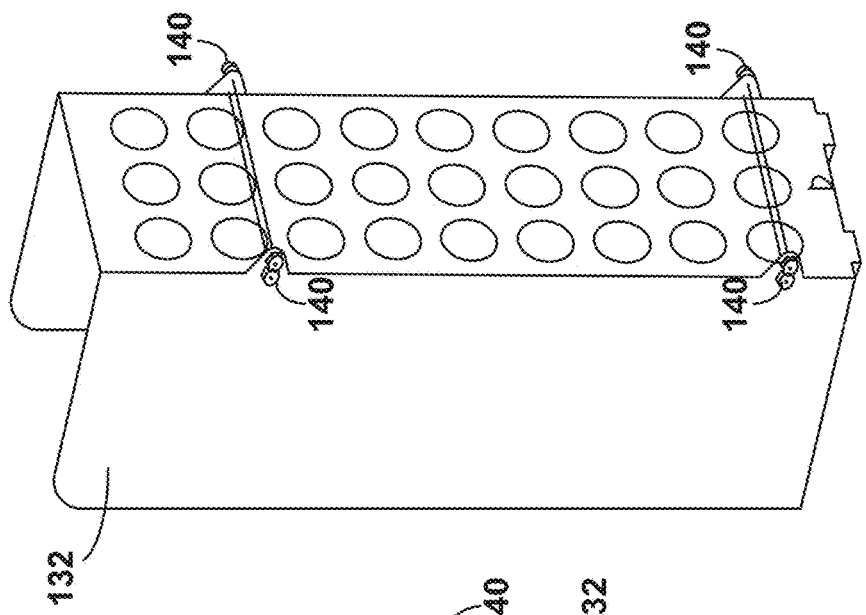
FIG. 11C is a rear perspective view of a tray, according to an example.
Figure 11B:
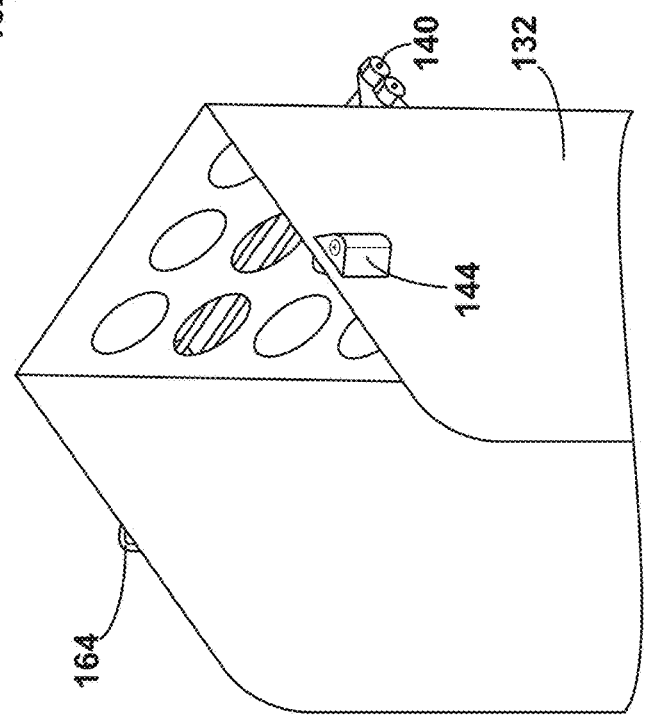
FIG. 11B is a close up front view of a tray, according to an example.
Figure 11A:
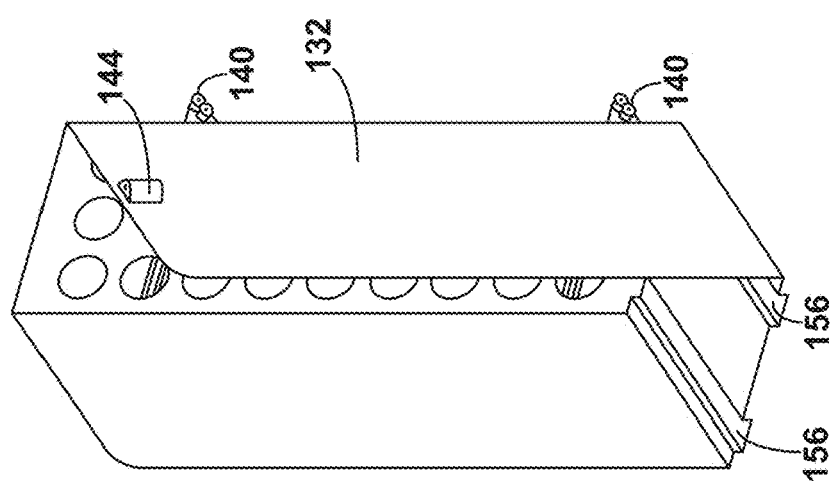
FIG. 11A is a front perspective view of a tray, according to an example.

FIG. 11A is a front perspective view of the tray 132 shown in FIG. 7, showing the nut 144, channels 156, and the rollers 140.

FIG. 11B is a close up front view of the tray 132 shown in FIG. 7, showing the nut 144, the nut 164, and the rollers 140.

FIG. 11C is a rear perspective view of the tray 132 shown in FIG. 7, showing the rollers 140. In FIG. 11C, the nut 144 and the nut 164 are not shown.

Figure 12:
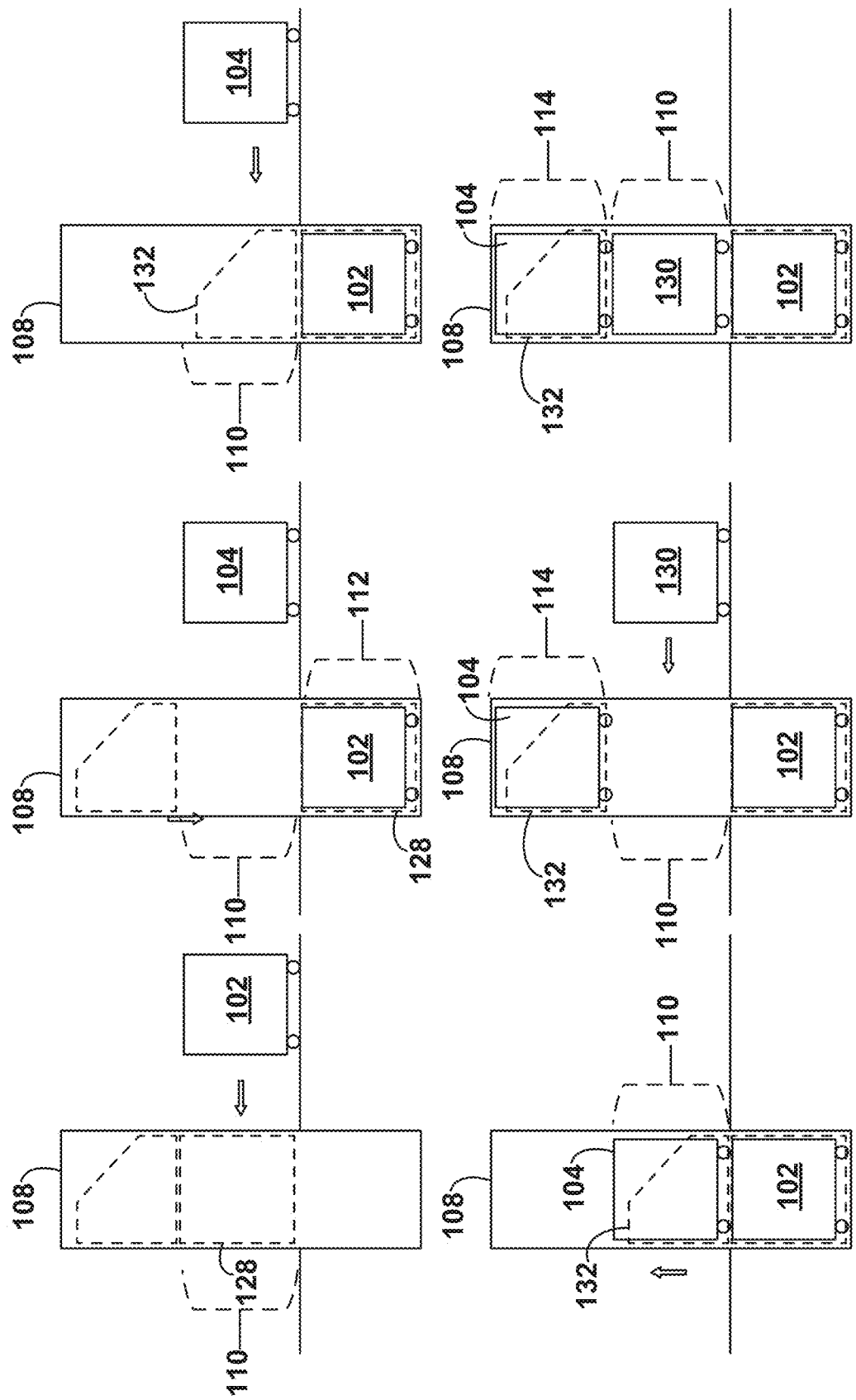
FIG. 12 is a schematic diagram of functionality related to a lift system, according to an example.

FIG. 12 is a schematic diagram of functionality related to the lift system 100 shown in FIG. 3. The upper left panel of FIG. 12 depicts (e.g., a flight attendant) moving (e.g., rolling) the first galley cart 102 into the frame 108 such that the first galley cart 102 is positioned within the first storage zone 110.

The upper center panel of FIG. 12 depicts moving, via the first lift 124 (e.g., the tray 128), the first galley cart 102 from the first storage zone 110 to the second storage zone 112.

The upper right panel and lower left panel of FIG. 12 depict (e.g., a flight attendant) moving the second galley cart 104 into the frame 108 (e.g., onto the tray 132) such that the second galley cart 104 is positioned within the first storage zone 110.

The lower center panel and lower right panel of FIG. 12 depict moving, via the second lift 126 (e.g., via the tray 132), the second galley cart 104 from the first storage zone 110 to the third storage zone 114 and (e.g., a flight attendant) moving the third galley cart 130 into the first storage zone 110 between the first galley cart 102 and the second galley cart 104.

When loading, the first lift 124 can lower the first galley cart 102 into the second storage zone 112 before or after the second lift 126 raises the second galley cart 104 into the third storage zone 114. Similarly, when unloading the first lift 124 can raise the first galley cart 102 from the second storage zone 112 to the first storage zone 110 before or after the second lift 126 lowers the second galley cart 104 from the third storage zone 114 to the first storage zone 110.

When loading, the third galley cart 130 generally is moved into the first storage zone 110 after the first galley cart 102 has been moved to the second storage zone 112 and after the second galley cart 104 has been moved to the third storage zone 114. When unloading, the third galley cart 130 generally is removed from the first storage zone 110 before the second galley cart 104 is lowered from the third storage zone 114 to the first storage zone 110 and before the first galley cart 102 is raised from the second storage zone 112 to the first storage zone 110.

Components of the lift system 100 shown in FIG. 7 can perform functions similar to those of corresponding components of the lift system 100 of FIG. 3, as described above.

FIG. 13 and FIG. 14 are block diagrams of a method 300 and a method 350 for installing a lift system. As shown in FIG. 13 and FIG. 14, the method 300 and the method 350 include one or more operations, functions, or actions as illustrated by blocks 302, 304, 306, 308, 310, 312, 314, and 316. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 302, the method 300 includes attaching the frame 108 to the floor deck 106 of the aircraft 10 such that the frame 108 defines the first storage zone 110, the second storage zone 112, and the third storage zone 114 that are (e.g., vertically) stacked, and such that the bottom end 116 of the first storage zone 110 is (e.g., vertically) aligned with the floor deck 106, the top end 118 of the second storage zone 112 is (e.g., vertically) aligned with the floor deck 106, and the bottom end 120 of the third storage zone 114 is (e.g., vertically) aligned with the top end 122 of the first storage zone 110. This functionality is described above with reference to FIG. 3.

At block 304, the method 300 includes installing, within the frame 108, the first lift 124 configured to move the first galley cart 102 from the first storage zone 110 to the second storage zone 112. This functionality is described above with reference to FIG. 3.

At block 306, the method 300 includes installing, within the frame 108, the second lift 126 configured to move the second galley cart 104 from the first storage zone 110 to the third storage zone 114. This functionality is described above with reference to FIG. 3.

At block 308, the method 350 includes moving the first galley cart 102 into the frame 108 such that the first galley cart 102 is positioned within the first storage zone 110. This functionality is described above with reference to FIG. 12.

At block 310, the method 350 includes moving, via the first lift 124, the first galley cart 102 from the first storage zone 110 to the second storage zone 112. This functionality is described above with reference to FIG. 12.

At block 312, the method 350 includes moving the second galley cart 104 into the frame 108 such that the second galley cart 104 is positioned within the first storage zone 110. This functionality is described above with reference to FIG. 12.

At block 314, the method 350 includes moving, via the second lift 126, the second galley cart 104 from the first storage zone 110 to the third storage zone 114. This functionality is described above with reference to FIG. 12.

At block 316, the method 350 includes moving the third galley cart 130 into the first storage zone 110 between the first galley cart 102 and the second galley cart 104. This functionality is described above with reference to FIG. 12.

Examples of the present disclosure can thus relate to one of the enumerated clauses (ECs) listed below.

EC 1 is a lift system for an aircraft, the lift system comprising: a first galley cart; a second galley cart; a floor deck; a frame that defines a first storage zone, a second storage zone, and a third storage zone that are stacked, wherein a bottom end of the first storage zone is aligned with the floor deck, a top end of the second storage zone is aligned with the floor deck, and a bottom end of the third storage zone is aligned with a top end of the first storage zone; a first lift configured to move the first galley cart from the first storage zone to the second storage zone; and a second lift configured to move the second galley cart from the first storage zone to the third storage zone.

EC 2 is the lift system of EC 1, wherein the first lift comprises a tray configured to support a third galley cart positioned in the first storage zone when the tray is within the second storage zone.

EC 3 is the lift system of EC 2, wherein the second lift comprises a second tray that is configured to house the second galley cart in the third storage zone while the third galley cart is positioned in the first storage zone and the first galley cart is positioned in the second storage zone.

EC 4 is the lift system of any of ECs 1-3, wherein the first lift comprises: a tray; a nut attached to the tray; a screw jack threadedly engaged with the nut; and a motor configured to rotate the screw jack to move the tray within the frame between the first storage zone and the second storage zone.

EC 5 is the lift system of EC 4, wherein the first lift comprises a roller configured to guide the tray within the frame via engagement of the roller with the frame.

EC 6 is the lift system of any of ECs 4-5, wherein the second lift comprises: a second tray; a second nut attached to the second tray; a second screw jack threadedly engaged with the second nut; and a second motor configured to rotate the second screw jack to move the second tray within the frame between the first storage zone and the third storage zone.

EC 7 is the lift system of any of ECs 1-6, wherein the first lift comprises a first tray and the second lift comprises a second tray, the lift system further comprising a control system configured to prevent collisions between the first tray and the second tray.

EC 8 is the lift system of any of ECs 1-7, further comprising a cooling system configured to cool contents of the first galley cart and the second galley cart.

EC 9 is the lift system of any of ECs 1-8, wherein the frame is a first frame and the lift system further comprises: a second frame; a first cooling system configured to cool contents of the first galley cart and the second galley cart; and a second cooling system configured to cool contents of one or more galley carts located within the second frame.

EC 10 is the lift system of any of ECs 1-9, wherein the first galley cart and the second galley cart are substantially equal in size.

EC 11 is the lift system of any of ECs 1-10, wherein the first lift comprises a tray with channels on an upper surface of the tray, wherein the channels are configured to receive wheels of a third galley cart.

EC 12 is the lift system of any of ECs 1-11, wherein the third storage zone is narrower than the first storage zone in a horizontal direction.

EC 13 is the lift system of EC 12, wherein the first lift comprises a first tray and the second lift comprises a second tray that is narrower than the first tray in the horizontal direction.

EC 14 is the lift system of EC 13, wherein the first lift further comprises: a first nut attached to the first tray; a first screw jack threadedly engaged with the first nut; and a first motor configured to rotate the first screw jack to move the first tray within the frame between the first storage zone and the second storage zone, wherein the second lift further comprises: a second nut attached to the second tray; a third nut attached to the second tray opposite the second nut; a second screw jack threadedly engaged with the second nut; a third screw jack threadedly engaged with the third nut opposite the second screw jack; and a second motor configured to rotate the second screw jack and the third screw jack to move the second tray within the frame between the first storage zone and the third storage zone.

EC 15 is the lift system of any of ECs 1-14, wherein the second galley cart is narrower than the first galley cart in a horizontal direction.

EC 16 is the lift system of any of ECs 1-15, further comprising: a first floor beam; and a second floor beam, wherein a first side of the frame abuts the first floor beam and a second side of the frame opposite the first side abuts the second floor beam.

EC 17 is the lift system of EC 16, wherein the floor deck is supported by the first floor beam and the second floor beam.

EC 18 is a lift system for an aircraft, the lift system comprising: a first galley cart; a second galley cart; a floor deck; a frame that defines a first storage zone, a second storage zone, and a third storage zone that are stacked, wherein a bottom end of the first storage zone is aligned with the floor deck, a top end of the second storage zone is aligned with the floor deck, and a bottom end of the third storage zone is aligned with a top end of the first storage zone; a first lift configured to move the first galley cart from the first storage zone to the second storage zone, the first lift comprising a first tray configured to support a third galley cart positioned in the first storage zone when the first tray is within the second storage zone; a second lift configured to move the second galley cart from the first storage zone to the third storage zone, the second lift comprising a second tray; and a control system configured to prevent collisions between the first tray and the second tray.

EC 19 is a method for installing a lift system in an aircraft, the method comprising: attaching a frame to a floor deck of the aircraft such that the frame defines a first storage zone, a second storage zone, and a third storage zone that are stacked, wherein a bottom end of the first storage zone is aligned with the floor deck, a top end of the second storage zone is aligned with the floor deck, and a bottom end of the third storage zone is aligned with a top end of the first storage zone; installing, within the frame, a first lift configured to move a first galley cart from the first storage zone to the second storage zone; and installing, within the frame, a second lift configured to move a second galley cart from the first storage zone to the third storage zone.

EC 20 is the method of EC 19, further comprising: moving the first galley cart into the frame such that the first galley cart is positioned within the first storage zone; moving, via the first lift, the first galley cart from the first storage zone to the second storage zone; moving the second galley cart into the frame such that the second galley cart is positioned within the first storage zone; moving, via the second lift, the second galley cart from the first storage zone to the third storage zone; and moving a third galley cart into the first storage zone between the first galley cart and the second galley cart.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A lift system for an aircraft, the lift system comprising:
   a first galley cart;
   a second galley cart;
   a third galley cart;
   a floor deck;
   a frame that defines a first storage zone, a second storage zone, and a third storage zone that are stacked to form a continuous column, wherein a bottom end of the first storage zone is aligned with the floor deck, a top end of the second storage zone is aligned with the floor deck, and a bottom end of the third storage zone is aligned with a top end of the first storage zone;
   a first lift configured to move the first galley cart from the first storage zone to the second storage zone, the first lift comprising:
      a tray;
      a nut attached to the tray; and
      a screw jack threadedly engaged with the nut, wherein the screw jack extends along the first storage zone, the second storage zone, and the third storage zone; and
   a second lift configured to move the second galley cart from the first storage zone to the third storage zone;
   wherein any portion of the third galley cart being positioned in any portion of the first storage zone prevents the first galley cart from vacating the second storage zone and moving into the first storage zone and prevents the second galley cart from vacating the third storage zone and moving into the first storage zone.

2. The lift system of claim 1, wherein the tray is configured to support the third galley cart positioned in the first storage zone when the tray is within the second storage zone.

3. The lift system of claim 2, wherein the second lift comprises a second tray that is configured to house the second galley cart in the third storage zone while the third galley cart is positioned in the first storage zone and the first galley cart is positioned in the second storage zone.

4. The lift system of claim 1, wherein the first lift further comprises:
   a motor configured to rotate the screw jack to move the tray within the frame between the first storage zone and the second storage zone.

5. The lift system of claim 4, wherein the first lift comprises a roller configured to guide the tray within the frame via engagement of the roller with the frame.

6. The lift system of claim 4, wherein the second lift comprises:
   a second tray;
   a second nut attached to the second tray;
   a second screw jack threadedly engaged with the second nut, wherein the second screw jack extends along the first storage zone, the second storage zone, and the third storage zone; and
   a second motor configured to rotate the second screw jack to move the second tray within the frame between the first storage zone and the third storage zone.

7. The lift system of claim 1, wherein the second lift comprises a second tray, the lift system further comprising a control system configured to prevent collisions between the first tray and the second tray.

8. The lift system of claim 1, wherein the frame is a first frame and the lift system further comprises:
   a second frame;
   a first cooling system configured to cool contents of the first galley cart and the second galley cart; and
   a second cooling system configured to cool contents of one or more galley carts located within the second frame.

9. The lift system of claim 1, wherein the first galley cart and the second galley cart are substantially equal in size.

10. The lift system of claim 1, wherein the tray comprises channels on an upper surface of the tray, wherein the channels are configured to receive wheels of the third galley cart.

11. The lift system of claim 1, wherein the third storage zone is narrower than the first storage zone in a horizontal direction.

12. The lift system of claim 11, wherein the second lift comprises a second tray that is narrower than the tray in the horizontal direction.

13. The lift system of claim 12, wherein the first lift further comprises:
   a first motor configured to rotate the screw jack to move the first tray within the frame between the first storage zone and the second storage zone, wherein the second lift further comprises:
   a second nut attached to the second tray;
   a third nut attached to the second tray opposite the second nut;
   a second screw jack threadedly engaged with the second nut, wherein the second screw jack extends along the first storage zone and the third storage zone;
   a third screw jack threadedly engaged with the third nut opposite the second screw jack, wherein the third screw jack extends along the first storage zone and the third storage zone; and
   a second motor configured to rotate the second screw jack and the third screw jack to move the second tray within the frame between the first storage zone and the third storage zone.

14. The lift system of claim 1, wherein the second galley cart is narrower than the first galley cart in a horizontal direction.

15. The lift system of claim 1, further comprising:
   a first floor beam; and
   a second floor beam, wherein a first side of the frame abuts the first floor beam and a second side of the frame opposite the first side abuts the second floor beam,
   wherein the continuous column formed by the first storage zone, the second storage zone, and the third storage zone passes through the floor deck between the first floor beam and the second floor beam.

16. The lift system of claim 15, wherein the floor deck is supported by the first floor beam and the second floor beam.

17. The lift system of claim 1, further comprising:
a fourth galley cart;
a fifth galley cart;
a sixth galley cart;
a second frame that defines a fourth storage zone, a fifth storage zone, and a sixth storage zone that are stacked to form a second continuous column, wherein a bottom end of the fourth storage zone is aligned with the floor deck, a top end of the fifth storage zone is aligned with the floor deck, and a bottom end of the sixth storage zone is aligned with a top end of the fourth storage zone;
a third lift configured to move the fourth galley cart from the fourth storage zone to the fifth storage zone; and
a fourth lift configured to move the fifth galley cart from the fourth storage zone to the sixth storage zone,
wherein any portion of the sixth galley cart being positioned in any portion of the fourth storage zone prevents the fourth galley cart from vacating the fifth storage zone and moving into the fourth storage zone and prevents the fifth galley cart from vacating the third sixth storage zone and moving into the fourth storage zone.

18. The lift system of claim 1, further comprising an aircraft, wherein the first galley cart is configured to move into and out of the first storage zone along the floor deck in a direction that is perpendicular to a longitudinal axis of a fuselage of the aircraft.

19. A method for installing a lift system in an aircraft, the method comprising:
attaching a frame to a floor deck of the aircraft such that the frame defines a first storage zone, a second storage zone, and a third storage zone that are stacked to form a continuous column, wherein a bottom end of the first storage zone is aligned with the floor deck, a top end of the second storage zone is aligned with the floor deck, and a bottom end of the third storage zone is aligned with a top end of the first storage zone;
installing, within the frame, a first lift configured to move a first galley cart from the first storage zone to the second storage zone, the first lift comprising:
a tray;
a nut attached to the tray; and
a screw jack threadedly engaged with the nut, wherein the screw jack extends along the first storage zone, the second storage zone, and the third storage zone; and
installing, within the frame, a second lift configured to move a second galley cart from the first storage zone to the third storage zone,
wherein any portion of a third galley cart being positioned in any portion of the first storage zone prevents the first galley cart from vacating the second storage zone and moving into the first storage zone and prevents the second galley cart from vacating the third storage zone and moving into the first storage zone.

20. The method of claim 19, further comprising:
manually moving the first galley cart into the frame such that the first galley cart is positioned within the first storage zone;
moving, via the first lift, the first galley cart from the first storage zone to the second storage zone;
manually moving the second galley cart into the frame such that the second galley cart is positioned within the first storage zone;
moving, via the second lift, the second galley cart from the first storage zone to the third storage zone; and
moving the third galley cart into the first storage zone between the first galley cart and the second galley cart.

* * * * *